United States Patent
Allidieres et al.

(10) Patent No.: US 11,530,781 B2
(45) Date of Patent: Dec. 20, 2022

(54) STATION AND METHOD FOR FILLING ONE OR MORE TANK(S)

(71) Applicant: L'Air Liquide, Societe Anonyme pour l'Etude et l'Exploitation des Procedes Georges Claude, Paris (FR)

(72) Inventors: Laurent Allidieres, Paris (FR); Mathilde Weber, Paris (FR); Etienne Werlen, Les Loges en Josas (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 17/153,812

(22) Filed: Jan. 20, 2021

(65) Prior Publication Data

US 2021/0222832 A1 Jul. 22, 2021

(30) Foreign Application Priority Data

Jan. 20, 2020 (FR) ...................................... 2000503

(51) Int. Cl.
| | |
|---|---|
| *F17C 5/06* | (2006.01) |
| *F17C 13/02* | (2006.01) |
| *F17C 13/04* | (2006.01) |

(52) U.S. Cl.
CPC .............. *F17C 13/026* (2013.01); *F17C 5/06* (2013.01); *F17C 13/025* (2013.01); *F17C 13/04* (2013.01);
(Continued)

(58) Field of Classification Search
CPC ...... F17C 13/026; F17C 13/025; F17C 13/04; F17C 5/06; F17C 2201/035;
(Continued)

(56) References Cited

U.S. PATENT DOCUMENTS

| | | | | |
|---|---|---|---|---|
| 5,884,675 A | * | 3/1999 | Krasnov | .................... F17C 5/06 141/18 |
| 7,575,012 B2 | * | 8/2009 | Miki | ......................... F17C 7/00 137/1 |

(Continued)

FOREIGN PATENT DOCUMENTS

| | | |
|---|---|---|
| EP | 2 212 614 | 8/2010 |
| EP | 2 375 121 | 10/2011 |

(Continued)

OTHER PUBLICATIONS

Search Report and Written Opinion for EP 2 000 503, dated Sep. 8, 2020.

(Continued)

*Primary Examiner* — Nicolas A Arnett
(74) *Attorney, Agent, or Firm* — Christopher J. Cronin

(57) ABSTRACT

Station for filling one or more tank(s) with pressurized gas, in particular pressurized hydrogen, comprising at least two pressurized gas source stores, a transfer pipe having an upstream end connected parallel to the source stores and a downstream end intended to be connected to a tank to be filled, the station comprising a valve assembly for controlling the transfer of gas between the sources and the tank to be filled and an electronic controller connected to the valve assembly and configured to control the valve assembly, the electronic controller being configured to implement successive transfers of gas between the source stores and the tank to be filled via successive pressure balancing sequences, the electronic controller being configured to determine the temperature attained by the gas in the source stores or by the source stores during transfers of gas and, when said attained temperature is below a determined threshold, to prevent or to interrupt this transfer of gas or to reduce the flow of gas transferred during said transfer.

12 Claims, 2 Drawing Sheets

(52) U.S. Cl.
CPC ............... *F17C 2201/035* (2013.01); *F17C 2205/0142* (2013.01); *F17C 2205/0157* (2013.01); *F17C 2205/0326* (2013.01); *F17C 2205/0338* (2013.01); *F17C 2205/0364* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0157* (2013.01); *F17C 2227/043* (2013.01); *F17C 2250/032* (2013.01); *F17C 2250/043* (2013.01); *F17C 2250/0439* (2013.01); *F17C 2250/0631* (2013.01); *F17C 2250/0636* (2013.01); *F17C 2250/0694* (2013.01); *F17C 2250/072* (2013.01); *F17C 2260/025* (2013.01); *F17C 2260/026* (2013.01); *F17C 2260/036* (2013.01); *F17C 2265/065* (2013.01); *F17C 2270/0139* (2013.01); *F17C 2270/0168* (2013.01); *F17C 2270/0184* (2013.01)

(58) Field of Classification Search
CPC ...... F17C 2205/0142; F17C 2205/0157; F17C 2205/0326; F17C 2205/0338; F17C 2205/0364; F17C 2221/012; F17C 2223/0123; F17C 2223/036; F17C 2225/0123; F17C 2225/036; F17C 2227/0157; F17C 2227/043; F17C 2250/032; F17C 2250/043; F17C 2250/0439; F17C 2250/0631; F17C 2250/0636; F17C 2250/0694; F17C 2250/072; F17C 2260/025; F17C 2260/026; F17C 2260/036; F17C 2265/065; F17C 2270/0139; F17C 2270/0168; F17C 2270/0184
See application file for complete search history.

(56) References Cited

U.S. PATENT DOCUMENTS

| | | | | |
|---|---|---|---|---|
| 7,866,354 | B2* | 1/2011 | Kanoya | F17C 5/06 141/95 |
| 8,122,918 | B2* | 2/2012 | Handa | F17C 5/00 141/95 |
| 8,435,700 | B2* | 5/2013 | Okawachi | H01M 8/04388 429/515 |
| 9,109,750 | B2* | 8/2015 | Okawachi | F17C 7/00 |
| 9,249,935 | B2* | 2/2016 | Okawachi | F16K 31/0655 |
| 9,343,754 | B2* | 5/2016 | Inagi | H01M 8/04014 |
| 10,167,999 | B2* | 1/2019 | Handa | F17C 13/084 |
| 10,451,219 | B2 | 10/2019 | Ravinel | |
| 10,465,849 | B2* | 11/2019 | Handa | F17C 5/007 |
| 10,648,618 | B2* | 5/2020 | Uchida | F17C 13/026 |
| 2005/0178463 | A1* | 8/2005 | Kountz | F17C 9/02 141/4 |
| 2012/0267002 | A1* | 10/2012 | Kittilsen | F17C 13/02 141/4 |
| 2018/0038550 | A1* | 2/2018 | Kondo | F17C 5/06 |
| 2021/0278045 | A1* | 9/2021 | Yoshida | F17C 13/025 |

FOREIGN PATENT DOCUMENTS

| | | |
|---|---|---|
| FR | 3 032 257 | 8/2016 |
| FR | 3 060 550 | 6/2018 |

OTHER PUBLICATIONS

Bourgeois, et al., "The temperature evolution in compressed gas filling processes: A review," International Journal of Hydrogen Energy, 2017, pp. 1-25.
Bourgeois, et al., "Optimization of hydrogen vehicle refuelling requirements," International Journal of Hydrogen Energy, 2017, pp. 1-21.
Bourgeois, et al., "Evaluating the temperature inside a tank during a filling with highly-pressurized gas," International Journal of Hydrogen Energy, 2015, pp. 1-8.

* cited by examiner

STATION AND METHOD FOR FILLING ONE OR MORE TANK(S)

CROSS-REFERENCE TO RELATED APPLICATIONS

This application claims the benefit of priority under 35 U.S.C. § 119 (a) and (b) to French patent application No. FR 2000503, filed Jan. 20, 2020, the entire contents of which are incorporated herein by reference.

BACKGROUND

Field of the Invention

The invention relates to a station and to a method for filling one or more tank(s).

More specifically, the invention relates to a station for filling one or more tank(s) with pressurized gas, in particular pressurized hydrogen, comprising at least two pressurized gas source stores, a transfer pipe having an upstream end connected parallel to the source stores and a downstream end intended to be connected to a tank to be filled, the station comprising a valve assembly for controlling the transfer of gas between the sources and the tank to be filled and an electronic controller connected to the valve assembly and configured to control the valve assembly, the electronic controller being configured to implement successive transfers of gas between the source stores and the tank to be filled via successive pressure balancing sequences.

Related Art

The rapid filling (typically in less than 15 minutes) of high-pressure gas tanks on board fuel cell powered vehicles is basically performed by successive pressure balancing sequences between high-pressure source capacities or stores (200, 300, 450, 700, 850 or 1000 bar, for example) and the on-board tank. These methods, called "cascade" filling methods, are extensively described in literature.

When the source stores are depressurized, they experience a drop in temperature (due to the isentropic expansion of the gas contained therein). In the case of the successive filling of tanks, the successive depressurization of these source stores can lead to a drop in temperature below the minimum safety temperature of the tank. This can weaken the tank and potentially cause a hydrogen leak.

This phenomenon is particularly sensitive in composite source stores. Said sources are particularly used in compressor-less stations, where these tanks are integrated in frames, on movable chassis of the semi-trailer or MEGC (Multiple-Element Gas Container) type. Furthermore, in the event of excessively rapid and excessively low pressure depressurization, the plastic internal sealed liners of these composite stores can deform under the effect of the depressurization ("liner collapse"). An excessive deformation can cause a leak.

SUMMARY OF THE INVENTION

An aim of the present invention is to overcome all or some of the aforementioned disadvantages of the prior art.

To this end, the station according to the invention, which is also according to the generic definition provided by the above preamble, is basically characterized in that the electronic controller is configured to determine the temperature attained by the gas in the source stores or by the source stores during transfers of gas and, when said attained temperature is below a determined threshold, to prevent or to interrupt this transfer of gas or to reduce the flow of gas transferred during said transfer.

Furthermore, embodiments of the invention can comprise one or more of the following features:

- the station comprises a set of sensors for measuring the temperature of the gas in the source stores, the electronic controller being configured to determine, on the basis of the values measured by the temperature measurement sensors, the temperature attained by the gas in the source stores or by the source stores during transfers;
- the station comprises a set of sensors for measuring the pressure of the gas in the source stores, the electronic controller is configured to determine, on the basis of the values measured by the pressure measurement sensors, the temperature attained by the gas in the source stores or by the source stores during transfers;
- the station comprises a sensor for measuring the ambient temperature, the electronic controller being configured to determine, on the basis of the value measured by the ambient temperature measurement sensor, the temperature attained by the gas in the source stores or in the source stores during transfers;
- the electronic controller is configured to determine the flow of gas transferred during transfers and to determine, on the basis of said flow value, the temperature attained by the gas in the source stores or by the source stores during transfers;
- the electronic controller comprises a memory storing a set of reference table(s) or charts of gas transfer conditions, the electronic controller being configured to determine, on the basis of the reference tables and the current gas transfer conditions, the temperature attained by the gas in the source stores or by the source stores during transfers;
- the electronic controller is configured to estimate, on the basis of a computation module, the temperature attained by the gas in the source stores or by the source stores during transfers, which computation module computes, before and/or during a transfer, a mass and enthalpy balance applied to the gas in the source store and an energy exchange balance in the wall of the source store with the equation of the state of the gas: equation of the ideal or real gases, and a balance of the thermal exchanges between the wall of the source store and the outside of the source store.

The invention also relates to a method for filling one or more tank(s) with pressurized gas, in particular pressurized hydrogen, by means of a station comprising at least two pressurized gas source stores, a transfer pipe having an upstream end connected parallel to the source stores and a downstream end intended to be connected to a tank to be filled, the method comprising successive steps of transferring gas between the source stores and the tank by pressure balancing sequences, the method comprising a step of determining the temperature attained by the gas in the source stores or by the source stores during transfers of gas, a step of comparing this attained temperature with a determined threshold and a step of preventing or interrupting this transfer or a step of reducing the flow of transferred gas when said attained temperature is below said threshold.

According to other possible features:

- the method comprises a step of measuring the temperature and/or the pressure of the gas in the source stores before and/or during the transfer of gas and a step of computing, on the basis of the measured value of the temperature, and respectively of the pressure, the temperature attained during the transfer;

the method comprises a step of measuring the ambient temperature before the transfer of gas and a step of computing, on the basis of the measured value of the ambient temperature, the temperature attained during the transfer;

the step of determining the temperature is performed before or at the start of the transfer of gas, with this determination step predictively determining the time of the transfer of gas, during which said temperature attained, if applicable, said threshold;

during transfers of gas, the temperature attained by the gas in the source stores or by the source stores during transfers decreases, the method comprising, before this temperature reaches the threshold, a step of interrupting the transfer of gas from the relevant source store and a step of transferring gas from another source store;

the step of determining the temperature is performed before the gas is transferred from a first source store, and in that, after the step of determining the temperature, the method comprises a step of determining the first amount of gas transferred by the first source store to the tank to be filled, until the time when the determined temperature attains the threshold, when this first amount of gas is below a determined amount, the method comprising a step of changing the source store in order to transfer the gas via a second source store, i.e. without using the first source store to transfer the gas.

The invention can also relate to any alternative device or method comprising any combination of the features mentioned above or below within the scope of the claims.

BRIEF DESCRIPTION OF THE FIGURES

Further features and advantages will become apparent upon reading the following description, which is provided with reference to the figures, in which.

DETAILED DESCRIPTION OF THE INVENTION

Figure 1:
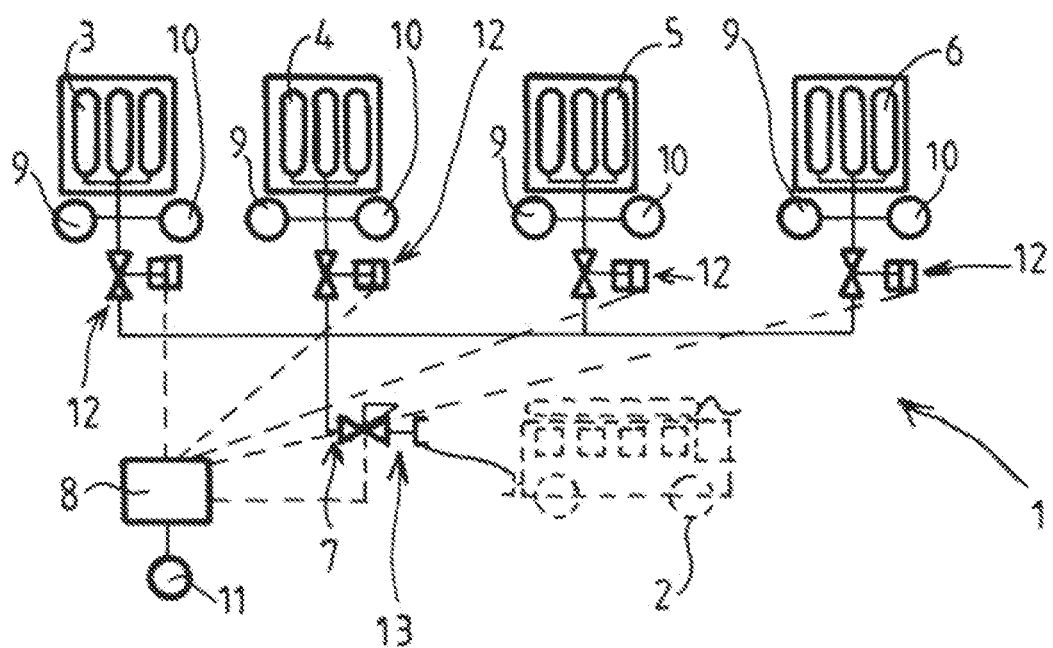
FIG. 1 shows a schematic and partial view illustrating an example of the structure and of the operation of a filling station according to the invention.

The illustrated station 1 comprises a transfer pipe 7 having an upstream end connected parallel to four pressurized gas source stores 3, 4, 5, 6. The transfer pipe 7 comprises a downstream end intended to be connected to a tank 2 to be filled. Of course, it is possible to contemplate a plurality of parallel downstream ends for simultaneously filling a plurality of tanks 2. Similarly, the number of source stores can be lower or higher and, if applicable, supplemented by other pressurized gas sources.

The station 1 comprises a valve assembly for controlling the transfer of gas between the sources and the tank 2 to be filled. For example, at least one valve 12 (preferably controlled) can be provided at the output of each source store. In the case whereby a source store is made up of a plurality of separate containers that are mounted in parallel, each of the containers can be provided with a specific isolation valve (for example, controlled). Similarly, before the downstream end, the transfer pipe 7 can comprise at least one valve 13, in particular a pressure and/or flow regulation valve.

The station further comprises an electronic controller 8 connected to the valve assembly and configured to control the valve assembly. The electronic controller 8 can comprise a computer and/or a microprocessor. The electronic controller 8 is configured, i.e. programmed and/or controlled, to implement successive transfers of gas between the source stores 3, 4, 5, 6 and the tank 2 to be filled via successive pressure balancing sequences. In other words, the controller 8 is able and designed to implement filling operations by cascade balancing sequences. Of course, the station can comprise other additional sources (store of liquefied gas connected to a vaporizer, for example, and/or a compressor).

For example, the gas can be compressed from a low-pressure source (frame, 200 bar semi-trailer, electrolyzer, etc.) to high-pressure source stores (typically between 450 and 1000 bar). The transfers of gas are performed between the source stores and the tanks 2 to be filled by passive balancing.

The tanks 2 can be filled directly from containers mounted on semi-trailers. Cascade type filling involves performing successive balancing sequences, beginning with the source stores with the lowest pressures, then by using source stores with increasingly high pressures. When the pressure is equal or substantially equal between the current source store and the tank (and/or when the flow of transferred gas falls below a threshold), the transfer is interrupted and another higher pressure source store is used.

According to an advantageous feature, the electronic controller 8 is configured to determine the temperature attained by the gas in the source stores 3, 4, 5, 6 or by the source stores 3, 4, 5, 6 during transfers of gas and, when said attained temperature is below a determined threshold, to prevent or to interrupt this transfer or to reduce the flow of gas transferred during said transfer.

For example, the electronic controller 8 uses a predictive module for computing the pressure and temperature at the end of a balancing sequence, allowing predictive computation of whether the temperature in the source tanks will be below the minimum safety temperature allowed by the source store.

If this is the case, the balancing sequence can be stopped before its completion and/or can be cancelled in favour of another balancing sequence (the next scheduled sequence). Alternatively or cumulatively, the flow of the transfer of gas between the source store and the tank 2 can be modified, i.e. reduced to reduce the cooling within the source store. This reduced flow can be, for example, a maximum flow determined by prior tests allowing the risk of damage to the tank to be reduced or removed.

This predictive estimate can be based, for example, on tests for extracting gas from a store at different flow rates, with a measurement of the temperature, allowing reference charts or tables to be constructed. These tests can be associated with visual inspections (in particular internal inspections) of the source stores, of the tomography or any other method for inspecting the damage of the liner (polymer, liner) allowing the conditions in which the damage occurs to be verified (deformation of the liner, cracking, etc.) and a chart to be established.

Alternatively and/or cumulatively, this prediction can be based on artificial intelligence routines (machine learning, for example, based on tests).

Thus, by knowing the current conditions (temperature, and/or pressure and/or flow) and the type of source store, the electronic controller 8 can determine in advance the temperature that will be attained during the transfer of gas (temperature curve as a function of time, for example).

Alternatively, the determination of this temperature during the transfer of gas can be provided by a documented computation module. For example, this temperature of the gas in the source store and/or in the wall of the source store can be based on the method described in one of the following publications:

"The temperature evolution in compressed gas filling processes: A review", International Journal of Hydrogen Energy, pp 1-25, 2017 (T. Bourgeois, F. Ammouri, D. Baraldi, P. Moretto);

"Optimization of hydrogen vehicle refuelling requirements", International Journal of Hydrogen Energy, pp 1-21, 2017 (T. Bourgeois, T. Brachmann, F. Barth, F. Ammouri, D. Zaepffel, D. Baraldi, D. Melideo);

"Evaluating the temperature inside a tank during a filling with highly-pressurized gas", International Journal of Hydrogen Energy, pp 1-8, 2015 (T. Bourgeois, F. Ammouri, M. Weber, C. Knapik).

In particular, the modelling of the estimate of the temperature of the gas in the source store and/or of the wall of the source store can be based on a simplified zero dimension (0D), for the gas, and one dimension (1D), for the tank wall, model taking into account the preservation of the mass and energy and the thermal exchanges at the wall of the source store to estimate the evolution of the temperature in the tanks with the pressure variations.

The estimate can be corrected and/or verified (redundancy) with the measurement of the temperature of the gas exiting the considered source store.

It is to be noted that this value of the temperature of the gas exiting the source store (or the temperature measurement at a localized site of the wall of the source store) does not always represent the minimum temperature attained inside the source store. Indeed, since the distribution of the temperatures may not be homogeneous, the use of a model provides more precise results.

Figure 2:
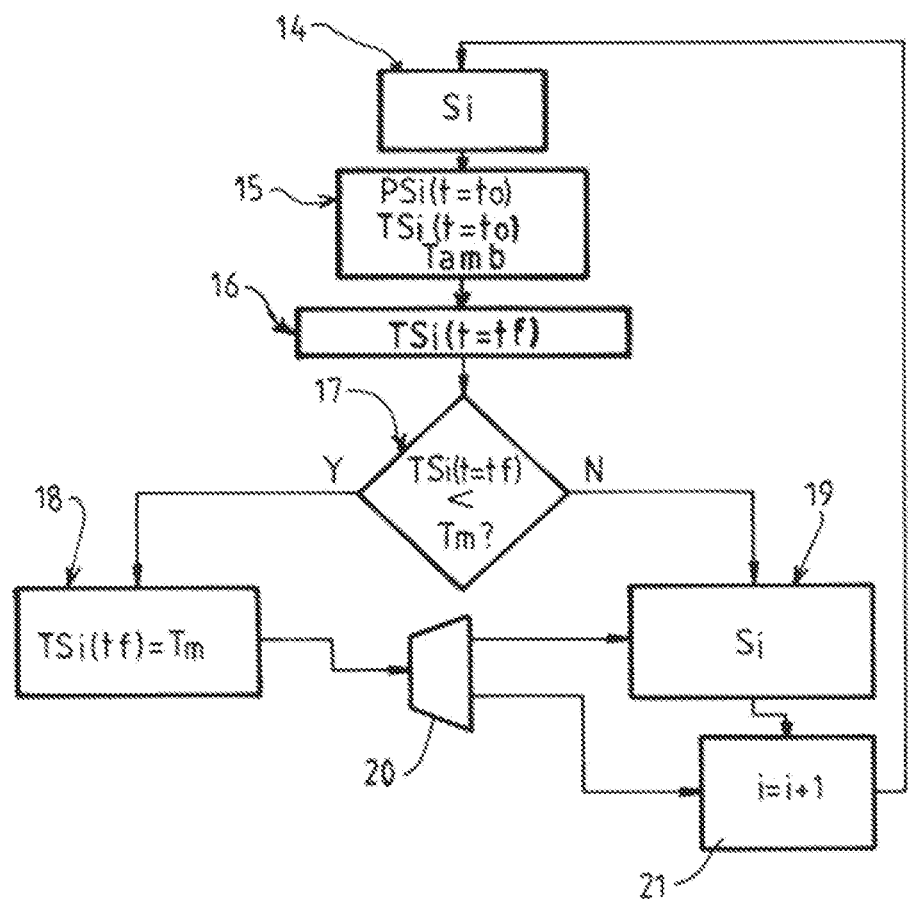
FIG. 2 shows a schematic and partial view illustrating an example of the operation of a filling station according to the invention.

FIG. 2 describes a possible embodiment.

When contemplating transferring gas from a first source store Si (step 14), the station can begin by determining the pressure $PSi(t=0)$ and the initial temperature $TSi(t=0)$ of the gas in the source store Si, as well as the initial pressure in the tank 2 to be filled $P2(t=0)$ (step 15) and preferably also the ambient temperature Tamb.

In the next step (step 16), the temperature at the end of the transfer (balancing sequence) in the source store Si can be computed ($Tsi(t=tf)$), as previously explained. At this point, the pressure in the source store Si at the end of the balancing sequence $PSi(t=tf)$, and optionally the pressure at the end of the balancing sequence in the tank 2, also can be computed.

Subsequently (step 17), this temperature of the source store at the end of the transfer $Tsi(t=tf)$ is compared to a determined threshold Tm (minimum temperature tolerated for storage, for example).

If this temperature of the source store at the end of the transfer $Tsi(t=tf)$ is below the determined threshold Tm (Y), provision can be made in a subsequent step to determine the pressure of the source store or the time during which this temperature of the source store attains the determined threshold Tm (step 18). This time can be defined as the updated end of the balancing sequence (i.e. that the end of the balancing sequence can be temporally advanced to avoid an excessive drop in temperature).

Consequently, the balancing sequence can be activated until this anticipated end (step 19). By way of an alternative (see alternative 20), the step 20 can involve transitioning to the next source store in the pressure order $i=i+1$. In other words, the transfer of gas from the source store in question is cancelled in favour of the next source store. This latter alternative (step 21), which switches to the next store $i=i+1$ by "skipping" the current store (without completing a transfer of gas) particularly can be performed if the transfer with the current store is excessively short and would result in the threshold being approached too quickly. Thus, depending on the estimated temperature of the source store, the system can decide not to launch the transfer with a source store for which the temperature is too low and which could only transfer a very small amount before attaining the permissible lower limit.

The extraction flow (the flow of transferred gas) can be computed each time and compared with the threshold flow.

Alternatively, the predictive model can run in real time on the basis of instrumented data, in particular the ambient temperature. Similarly, the pressure of the buffer store can be initiated in the model, on the basis of the ambient temperature, upon delivery of a new semi-trailer provided with source stores. In this way, the history of the source stores is continuously taken into account by the control system to determine an estimate of the temperature in the source stores.

Thus, if at any time, in particular during a transfer of gas, the estimated temperature approaches the determined threshold (preferably with a safety margin), then the system can automatically switch to another source store.

The station 1 thus can use high-pressure pressurized source stores for the cascade filling of the tanks of vehicles using a predictive system of computing the temperature in the source stores, whilst avoiding weakening these stores.

The successive temperatures during extractions are therefore controlled to prevent the source stores from attaining temperatures below their minimum operating temperature.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A station for filling one or more tank(s) with pressurized hydrogen gas, comprising at least two pressurized gas source stores, a transfer pipe having an upstream end connected parallel to the source stores and a downstream end intended to be connected to a tank to be filled, a valve assembly for controlling the transfer of gas between the sources and the tank to be filled, and an electronic controller connected to the valve assembly and configured to control the valve assembly, the electronic controller being configured to implement successive transfers of the pressurized hydrogen gas between the source stores and the tank to be filled via successive pressure balancing sequences, wherein the electronic controller is configured to:
use a predictive module for computing a predicted temperature that is predicted to be attained by the pressurized hydrogen gas in the source stores or from the source stores during transfers of the pressurized hydrogen gas and,
when the predicted temperature is below a determined threshold corresponding to a minimum safety temperature allowed by the source stores, to prevent or to interrupt this transfer of the pressurized hydrogen gas or to reduce a flow of the pressurized hydrogen gas transferred during said transfer.

2. The station of claim 1, further comprising a set of sensors for measuring the temperature of the pressurized hydrogen gas in the source stores, and in that the predicted temperature is computed on the basis of the values measured by the temperature measurement sensors, the temperature attained by the pressurized hydrogen gas in the source stores or by the source stores during transfers.

3. The station of claim 1, further comprising a set of sensors for measuring the pressure of the pressurized hydrogen gas in the source stores, and in that the predicted temperature is computed on the basis of the values measured by the pressure measurement sensors.

4. The station of claim 1, further comprising a sensor for measuring the ambient temperature, wherein the predicted temperature is computed on the basis of the value measured by the ambient temperature measurement sensor, the temperature attained by the pressurized hydrogen gas in the source stores or in the source stores during transfers.

5. The station of claim 1, wherein the electronic controller is further configured to determine the flow of the pressurized hydrogen gas transferred during transfers and the predicted temperature is computed on the basis of said flow value, the temperature attained by the pressurized hydrogen gas in the source stores or by the source stores during transfers.

6. The station of claim 1, wherein the electronic controller comprises a memory storing a set of reference table(s) or charts of gas transfer conditions and the predicted temperature is computed on the basis of the reference table(s) or the charts of transfer conditions, the temperature attained by the pressurized hydrogen gas in the source stores or by the source stores during transfers.

7. The station of claim 1, wherein before and/or during a transfer of the pressurized hydrogen gas, the electronic controller is further configured to compute a mass and enthalpy balance applied to the pressurized hydrogen gas in the source store and an energy exchange balance in the wall of the source store with the equation of the state of the pressurized hydrogen gas: equation of the ideal or real gases, and a balance of the thermal exchanges between the wall of the source store and the outside of the source store.

8. A method for filling one or more tank(s) with pressurized hydrogen gas with a station comprising at least two pressurized gas source stores, a transfer pipe having an upstream end connected parallel to the source stores and a downstream end intended to be connected to a tank to be filled, the method comprising the steps of:
performing successive transfers of the pressurized hydrogen gas between the source stores and the tank by pressure balancing sequences;
using a predictive module of an electronic controller to compute a predicted temperature that is predicted to be attained by the pressurized hydrogen gas in the source stores or by the source stores during transfers of the pressurized hydrogen gas;
comparing this predicted temperature with a determined threshold that corresponds to a minimum safety temperature allowed by the source stores; and
performing a computation of the predicted temperature that is lower than the determined threshold and preventing or interrupting this transfer or a step of reducing the flow of the transferred pressurized hydrogen gas when said predicted temperature is below said determined threshold.

9. The method of claim 8, further comprising the step of measuring the temperature and/or a pressure of the pressurized hydrogen gas in the source stores before and/or during the transfer of the pressurized hydrogen gas, wherein the predicted temperature is computed on the basis of the measured value of the temperature.

10. The method of claim 8, further comprising the step of:
measuring an ambient temperature before the transfer of the pressurized hydrogen gas,
wherein the predicted temperature is computed on the basis of the measured value of the ambient temperature.

11. The method of claim 8, wherein the step of computing is performed before or at the start of the transfer of the pressurized hydrogen gas.

12. The method of claim 11, wherein the step of determining the temperature is performed before the pressurized hydrogen gas is transferred from a first source store, and in that, after the step of determining the temperature, said method further comprises a step of determining the first amount of the pressurized hydrogen gas transferred by the first source store to the tank to be filled, until the time when the determined temperature attains the threshold, and in that, when this first amount of transferred pressurized hydrogen gas is below a determined amount, the method comprises a step of changing the source store in order to transfer the pressurized hydrogen gas via a second source store, i.e. without using the first source store to transfer the pressurized hydrogen gas.

* * * * *